(12) United States Patent
Fincher et al.

(10) Patent No.: US 8,985,612 B2
(45) Date of Patent: Mar. 24, 2015

(54) TOWING ASSEMBLY

(71) Applicants: Charles Kennith Fincher, Fredericksburg, VA (US); Chad Leighton Helland, Knoxville, TN (US); Paul Elhardt, Charlotte, NC (US); Ellis J. Smith, Belmont, NC (US)

(72) Inventors: Charles Kennith Fincher, Fredericksburg, VA (US); Chad Leighton Helland, Knoxville, TN (US); Paul Elhardt, Charlotte, NC (US); Ellis J. Smith, Belmont, NC (US)

(73) Assignee: Defense Products and Services Holding Company, Fredericksburg, VA (US)

( * ) Notice: Subject to any disclaimer, the term of this patent is extended or adjusted under 35 U.S.C. 154(b) by 0 days.

(21) Appl. No.: 13/684,714

(22) Filed: Nov. 26, 2012

(65) Prior Publication Data

US 2014/0145416 A1    May 29, 2014

Related U.S. Application Data

(63) Continuation of application No. 13/076,520, filed on Mar. 31, 2011, now Pat. No. 8,353,522.

(51) Int. Cl.
*B60D 1/54* (2006.01)
*B60D 1/44* (2006.01)
*B60D 1/01* (2006.01)

(52) U.S. Cl.
CPC ... *B60D 1/44* (2013.01); *B60D 1/01* (2013.01)
USPC ........................................................ 280/491.4

(58) Field of Classification Search
USPC ............ 280/491.1, 491.3, 491.4, 491.5, 495, 280/504
See application file for complete search history.

(56) References Cited

U.S. PATENT DOCUMENTS

| 4,869,521 A * | 9/1989 | Johnson ..................... 280/491.1 |
| 5,232,240 A * | 8/1993 | Johnson ..................... 280/491.5 |
| 8,353,522 B2 * | 1/2013 | Helland et al. ............. 280/491.4 |
| 2006/0249926 A1 * | 11/2006 | Smith ......................... 280/491.1 |
| 2007/0001425 A1 * | 1/2007 | Helms et al. ............... 280/456.1 |

* cited by examiner

*Primary Examiner* — Tony Winner
(74) *Attorney, Agent, or Firm* — Laurence P. Colton; Smith Risley Tempel Santos LLC

(57) ABSTRACT

A towing bar assembly that is convertible from an articulated assembly for extracting a vehicle in an inaccessible location to a rigid assembly for safely towing a vehicle on a road.

17 Claims, 4 Drawing Sheets

TOWING ASSEMBLY

CROSS REFERENCE TO RELATED APPLICATION

This application is a continuation of U.S. Pat. No. 8,353,522 B2 having an issue date of 15 Jan. 2013.

BACKGROUND OF THE INVENTION

1. Field of the Invention

The present invention generally relates to an assembly for towing. Specifically, the present invention relates to a towing bar assembly for towing vehicles. In particular, the present invention relates to a towing bar assembly that may convert from an articulating assembly for more easily extracting a vehicle from an inaccessible location to a rigid assembly for more safely towing a vehicle on a road. By having an assembly that may convert from one that articulates to one that is rigid, safe towing can be achieved with heretofore unrealized results.

2. Description of the Related Art

Assemblies for towing vehicles require many, often competing functions. As in many designs, in order to maximize the functionality of one operation there is often a concomitant reduction in the functionality of another operation. For example, in order to extract vehicles from an inaccessible location, such as a ditch, it is preferable to have a supple and flexible assembly to reach the ditched vehicle. Such assemblies are often woven fabric, multi-strand cable, or other substantially tensile structures. However, after extraction, when towing the vehicle on a road, it is preferable to have a rigid assembly to more securely affix the towed vehicle to the towing vehicle. Such assemblies are often of rigid triangular shape. However, such rigid assemblies, although safer for towing on the road, are of far less use in the extraction process. There is therefore a great need in the art for a towing assembly that can both reach difficult locations and still safely tow the extracted vehicle.

Accordingly, there is now provided with this invention an improved towing assembly effectively overcoming the aforementioned difficulties and longstanding problems inherent in towing vehicles. These problems have been solved in a simple, convenient, and highly effective way by which to construct a towing assembly.

SUMMARY OF THE INVENTION

According to one aspect of the invention, a towing assembly comprising a hitch and a pair of members pivotally attached to the hitch is disclosed. Each member has a first shaft, a second shaft, and a locking joint therebetween.

According to another aspect of the invention, a towing bar comprising a lunette, a first shaft attached at one end to the lunette, a second shaft attached at one end to the lunette, a first elbow joint attached to the first shaft at another end, a second elbow joint attached to the second shaft at another end, a third shaft attached at one end to the first elbow joint, and a fourth shaft attached at one end to the second elbow joint is disclosed.

According to yet another aspect of the invention, an articulating towing assembly comprising a hitch and a pair of members attached to the hitch is disclosed. Each pair of members has two shafts and a locking joint between each of the two shafts of each of the pair of members. The pair of members locked for rigidly securing the orientation thereof with respect to the hitch.

As will be appreciated by those persons skilled in the art, a major advantage of the present invention is providing a towing assembly that can both reach difficult locations and still safely tow the extracted vehicle. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein.

DESCRIPTION OF THE PREFERRED EMBODIMENT

Figure 1:
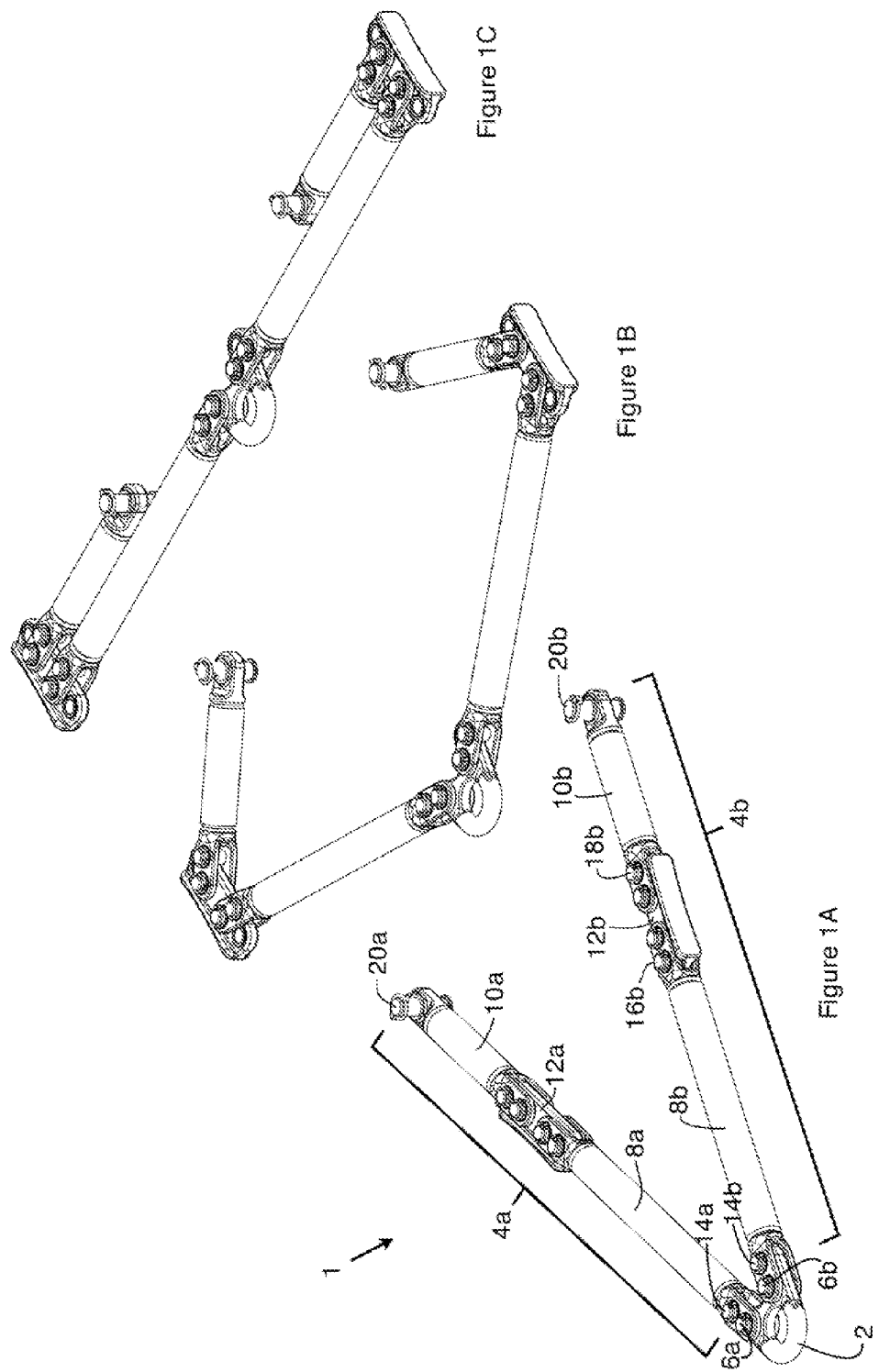
FIG. 1A is an orthogonal view of the towing assembly in its extended position.
FIG. 1B is an orthogonal view of the towing assembly in a partially folded position.
FIG. 1C is an orthogonal view of the towing assembly in its fully folded position.

The following preferred embodiment as exemplified by the drawings is illustrative of the invention and is not intended to limit the invention as encompassed by the claims of this application.

The assembly for towing 1, as illustrated generally in FIGS. 1-4, is for extracting an immobilized vehicle and then towing it. The towing assembly 1 is preferably made of steel, of either solid or hollow elements. The towing assembly comprises a hitch 2, often referred in the industry as a lunette. The hitch 2 is typically of a toroidal shape for engagement with a pintle hook (not shown) attached to a towing vehicle. The hitch may be of a variety of types for such engagement, as is well known to those skilled in the art. Attached to the hitch 2 are two members 4a and 4b. Members 4a and 4b are each pivotally attached to the hitch 2 by a pin 6a and 6b, respectively. In one embodiment, the pin pivotally attaching the members to the hitch is a threaded bolt having a nut to secure it. In other embodiments, the pin may be a cotterpin or a bolt threaded into the hitch itself In still other embodiments, a spring loaded detent mechanism may be used. Multiple types of attachments may be used to pivotally attach the members to the hitch, as is well known to those skilled in the art.

The two members 4a and 4b are preferably symmetrical with each other and accordingly member 4a has two shafts 8a and 10a with a joint 12a therebetween and member 4b has two shafts 8b and 10b with a joint 12b therebetween. It is the shafts 8a and 8b of members 4a and 4b, respectively that are pivotally attached to the hitch 2. The orientation of the attachment of the members to the hitch may be fixed in place by a locking mechanism 14a and 14b, respectively. In one embodiment, the locking mechanism fixing the orientation of the members to the hitch is a threaded bolt having a nut to secure it. In other embodiments, the locking mechanism may be a cotterpin or a bolt threaded into the hitch itself In still other embodiments, a spring loaded detent mechanism may be used. Multiple types of locking mechanisms may be used to lock the orientation of the members to the hitch, as is well known to those skilled in the art.

Each of the two shafts of each of the members are attached to one another by the joint 12a and 12b. Typically referred to as an elbow joint by those skilled in the art, the joints 12a and 12b may also be used to lock the orientation of each of the respective shafts in an aligned position. In one embodiment, the locking joints 12a and 12b fixing the orientation of the shafts to each other each have pins 16a and 18a, and 16b and 18b. In other embodiments, the pins may be threaded bolts each having a nut to secure it. In yet other embodiments, the locking mechanism may be a cotterpin or a bolt threaded into the joint itself. In still other embodiments, a spring loaded detent mechanism may be used. Multiple types of locking mechanisms may be used to lock the orientation of the shafts with each other, as is well known to those skilled in the art.

The aligned position, specifically shown in FIG. 1A, allows the towing assembly to form a substantially equilateral triangle when the towing assembly is in its extended position. Typically, this aligned position may be achieved when tensile force is substantially equally applied to each pair of shafts of each pair of members.

When each of the pins 14a and b, 16a and b, and 18a and b, are disengaged from their respective joints, the towing assembly may articulate from its extended aligned position through an intermediate position illustrated in FIG. 1B, to a folded position illustrated in FIG. 1C. When the towing assembly is in the fully folded position illustrated in FIG. 1C, each shaft of each member is substantially parallel to each other.

Attached to the end of shafts 10a and 10b are attaching mechanisms 20a and 20b for attachment to a vehicle to be towed. Many types of such mechanisms may be used, for example, shackles, eye bolts, or universal joints as shown in FIG. 2, as is well known to those skilled in the art.

Figure 2:
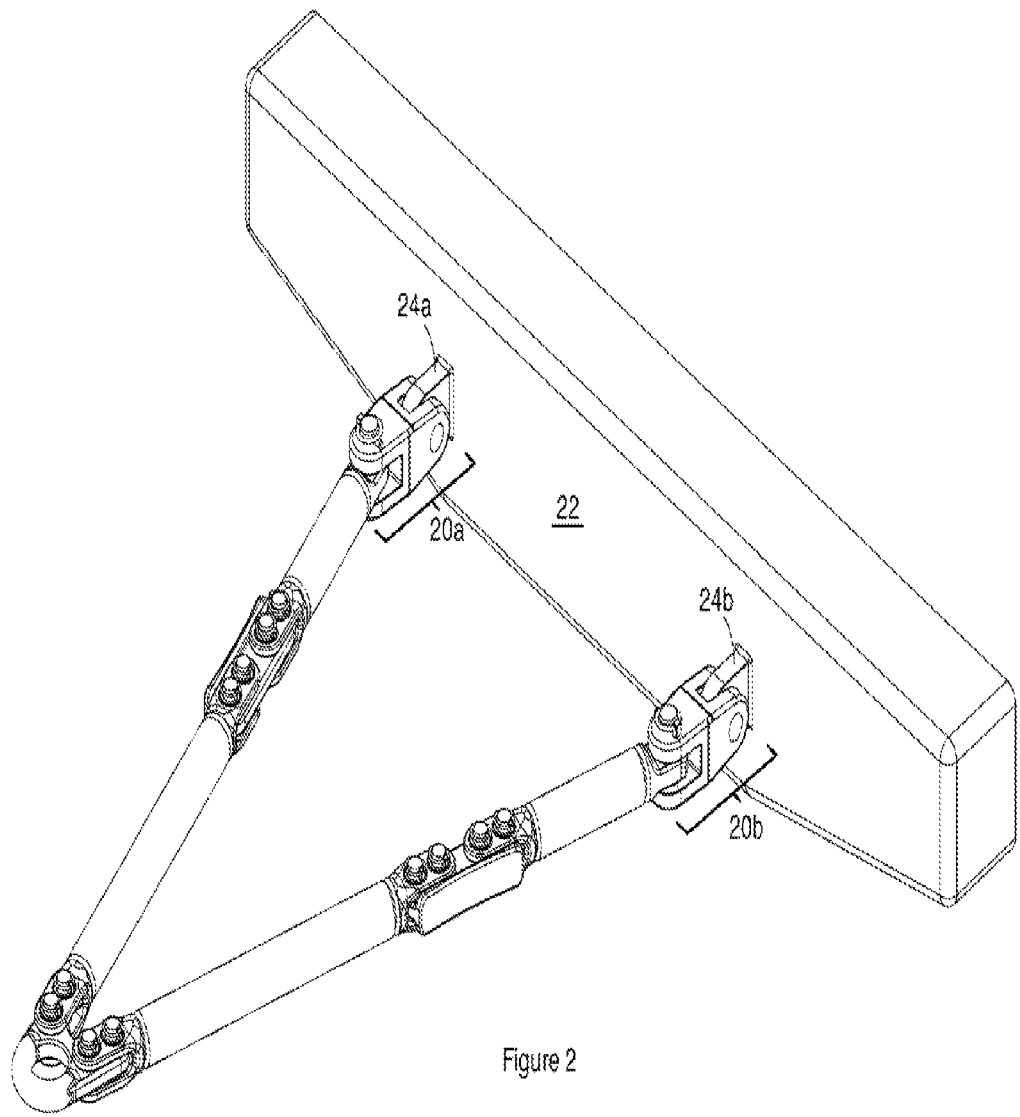
FIG. 2 is an orthogonal view of the towing assembly in its extended position attached to a bumper.

FIG. 2 depicts the towing assembly 1 attached to a bumper 22 of a vehicle to be towed. As shown, the bumper 22 has two attaching devices 24a and 24b for mating with the attaching mechanisms 20a and 20b, respectively. Until the locking pins 14a and b, 16a and b, and 18a and b are in engagement with their respective joints, the towing assembly may articulate for ease of attachment to an otherwise inaccessible vehicle.

Figure 3:
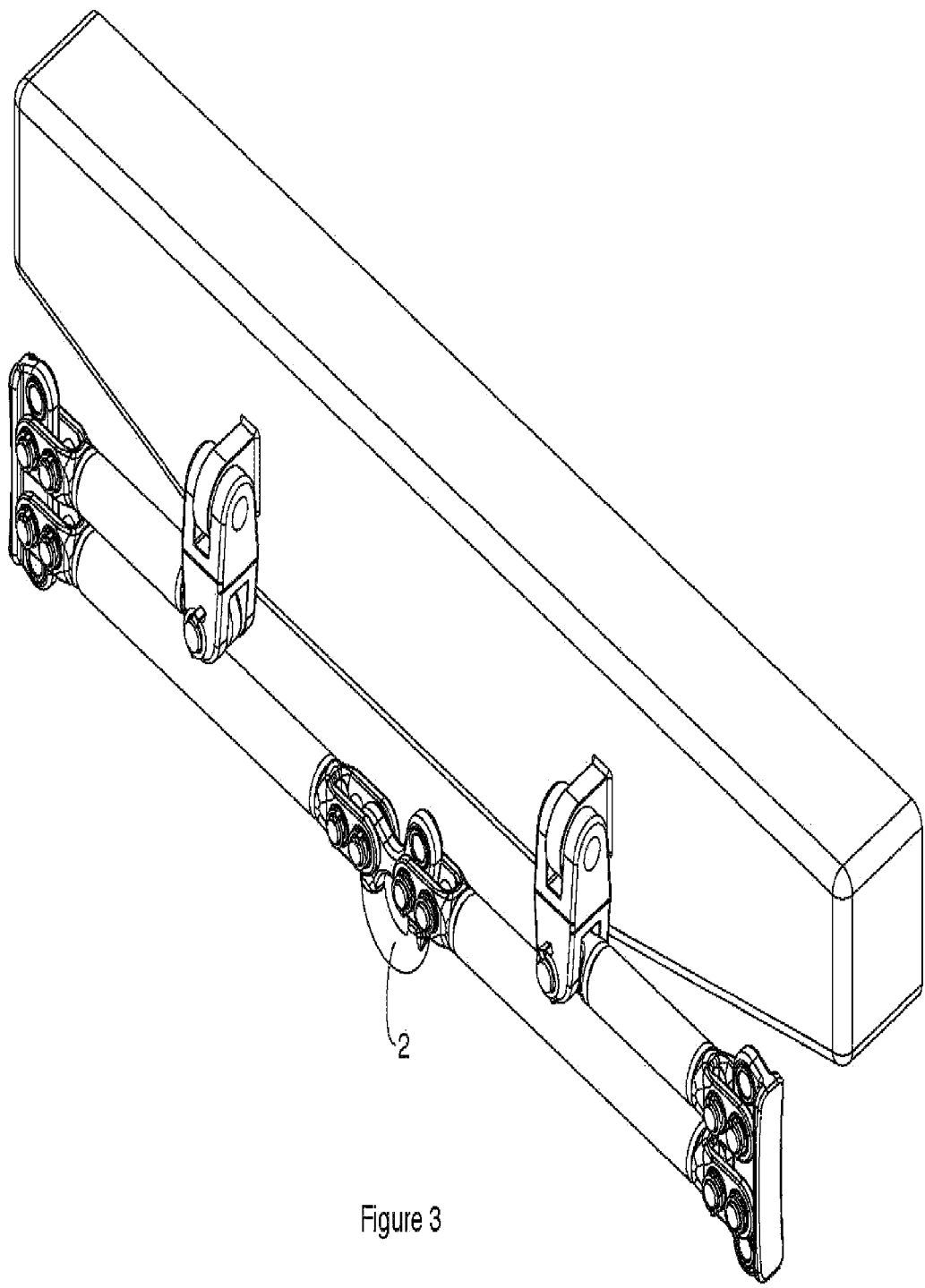
FIG. 3 is an orthogonal view of the towing assembly in its fully folded position attached to a bumper.

FIG. 3 also depicts the towing assembly 1 attached to a bumper 22 of a vehicle, although in its substantially folded position. In this embodiment, the bumper of the vehicle to which the towing assembly is attached is the towing vehicle. Accordingly, when not in use, it is preferable to have it in its folded position. In this embodiment, it is the hitch 2 that is used to attach to the vehicle to be towed.

Figure 4:
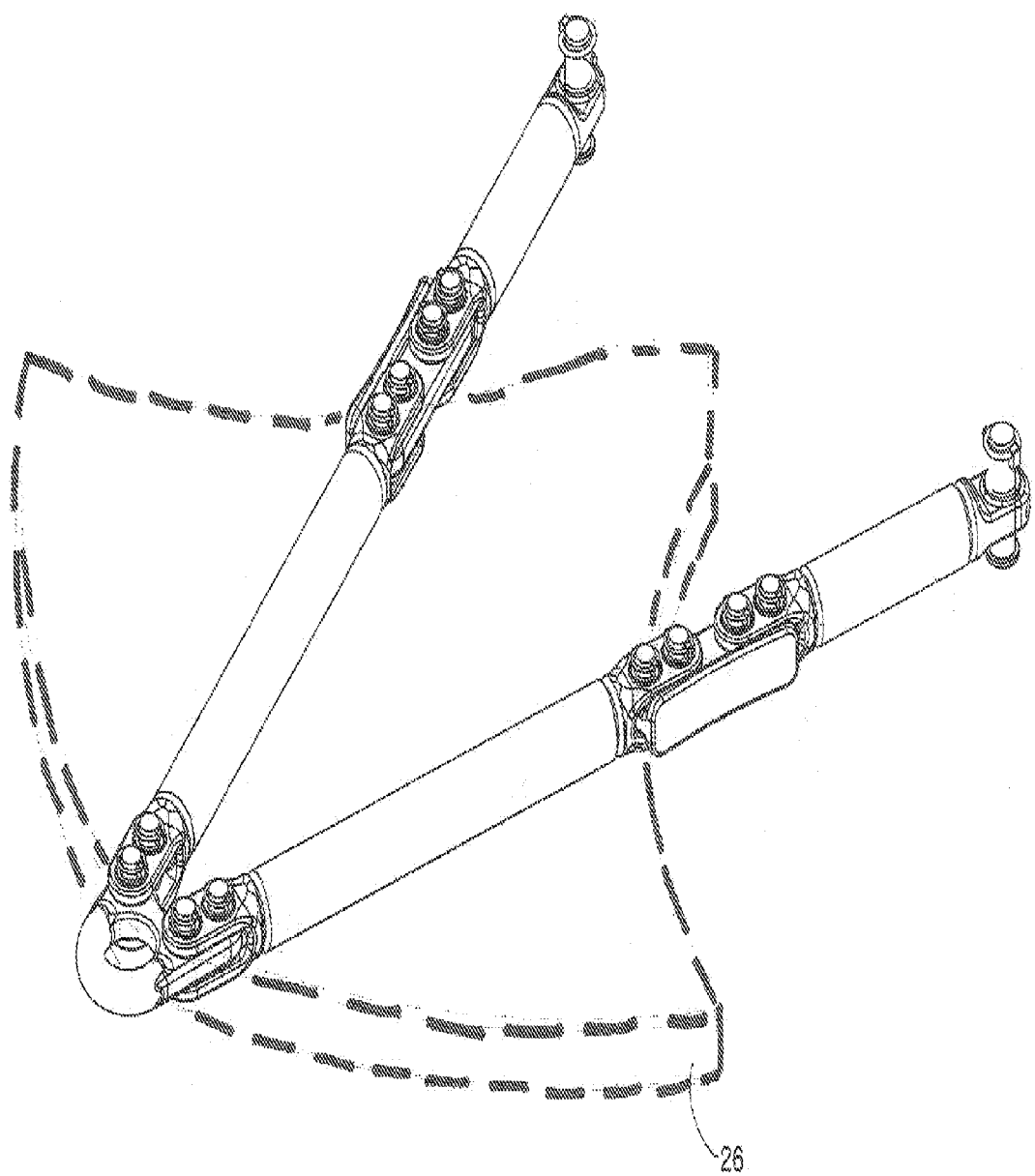
FIG. 4 is an orthogonal view of the towing assembly illustrating its range of motion.

In FIG. 4, the space defined by dotted line 26 illustrates the range of motion of the towing assembly. Thus, although made of rigid components, the towing assembly can articulate through a wide range of motion. This allows attachment to a vehicle when it is in a difficult position for access.

When, for example, the ditched vehicle has been extracted from its immobilized position, the towing assembly can be moved from its articulated position (FIG. 1B) to its fully extended position (FIG. 1A). Having moved into its fully extended, substantially equilateral triangular configuration (FIG. 1A), all of the shafts can be locked into their respective locking joints so that the towed vehicle can be more safely towed along a thoroughfare.

Although the particular embodiments shown and described above will prove to be useful in many applications in the towing art to which the present invention pertains, further modifications of the present invention will occur to persons skilled in the art. All such modifications are deemed to be within the scope and spirit of the present invention as defined by the appended claims.

The invention claimed is:

1. A towing assembly, comprising:
   a) a hitch; and
   b) a pair of members each pivotally attached to said hitch, wherein each of the pair of members has a first shaft, a second shaft, and a pivotable locking joint between the first shaft and the second shaft; and
   c) a means for fixing an orientation of said members relative to said hitch,
   whereby the first shaft and the second shaft are pivotable relative to each other about the pivotable locking joint in an unlocked position and the first shaft and the second shaft are not pivotable relative to each other about the pivotable locking joint in a locked position.

2. The assembly of claim 1, wherein said assembly can move between a first position extended to form a substantially equilateral triangle and a second position in which said first and said second shafts of each pair of members are substantially parallel with each other.

3. The assembly of claim 2, wherein when a tensile force is substantially equally applied to said pair of members said first and second shafts of each of said pair of members are substantially aligned for locking said locking joint in said first position.

4. The assembly of claim 3, wherein said locking joint comprises a hole for each of said shafts connected thereto.

5. The assembly of claim 4, further comprising a threaded pin secured with a nut for use in each of said holes when securing said locking joint in the locked position.

6. The assembly of claim 1, wherein said means for fixing comprises a hole having a pin therein.

7. The assembly of claim 6, wherein said pin is threaded and secured with a nut.

8. A towing bar assembly, comprising:
   a) a lunette;
   b) a first shaft attached at one end to said lunette, and having a first locking elbow joint attached at the other end;
   c) a second shaft attached at one end to said lunette, and having a second locking elbow joint attached at the other end;
   d) a third shaft attached at one end to said first locking elbow joint;
   e) a fourth shaft attached at one end to said second locking elbow joint; and
   f) a means for fixing an orientation of said first and second shafts relative to said lunette,
   whereby the first shaft and the second shaft are pivotable relative to each other about the first locking elbow joint in an unlocked position and the first shaft and the second shaft are not pivotable relative to each other about the first locking elbow joint in a locked position; and
   whereby the third shaft and the fourth shaft are pivotable relative to each other about the second locking elbow joint in an unlocked position and the third shaft and the fourth shaft are not pivotable relative to each other about the second locking elbow joint in a locked position.

9. The assembly of claim 8, further comprising a first attaching mechanism at another end of said third shaft and a second attaching mechanism at another end of said fourth shaft, wherein said attaching mechanisms are adapted for attaching to a vehicle to be towed.

10. The assembly of claim 8, wherein said means for fixing comprises a hole having a pin therein.

11. The assembly of claim 10, wherein said pin is threaded and secured with a nut.

12. The assembly of claim 8, wherein when a tensile force is substantially equally applied to said first, said second, said third, and said fourth shafts, said first and said third shafts are substantially aligned and said second and said fourth shafts are substantially aligned for locking said first and said second locking elbow joints so that said assembly is in said first position.

13. The assembly of claim 12, wherein each of said locking elbow joints comprises a hole for locking each of said shafts connected thereto.

14. The assembly of claim 13, comprising a threaded pin secured with a nut for use in each of said holes when securing said locking elbow joints in the locked position.

15. An articulating towing assembly, comprising:
a) a hitch;
b) a pair of members attached to said hitch, wherein each pair of members has two shafts and a pivotable locking joint between each of said two shafts of each of said pair of members; and
c) a means for fixing an orientation of said members relative to said hitch,
wherein each of said pair of members can be locked in a locked position for rigidly securing an orientation thereof with respect to said hitch.

16. The assembly of claim 15, further comprising a threaded pin secured with a nut through a hole in said attachment for securing each of said pair of members in the locked position.

17. The assembly of claim 15, wherein said assembly can move between a first position extended to form a substantially equilateral triangle in which said shafts of each of said members are substantially aligned and a second position in which said shafts of each of said members are substantially parallel with each other.

* * * * *